United States Patent [19]

Sakaida et al.

[11] Patent Number: 4,917,591
[45] Date of Patent: Apr. 17, 1990

[54] APPARATUS FOR CURING RESIN IMPREGNATED IN FILTER ELEMENT

[75] Inventors: Atsushi Sakaida, Nagoya; Masanori Suzuki, Kariya, both of Japan

[73] Assignee: Nippondenso Co., Ltd., Kariya, Japan

[21] Appl. No.: 10,856

[22] Filed: Feb. 4, 1987

[30] Foreign Application Priority Data

Feb. 7, 1986 [JP] Japan .................................. 61-24179

[51] Int. Cl.[4] ............................................. A01J 21/00
[52] U.S. Cl. ................................ 425/392; 425/403.1; 425/437; 425/446; 156/499
[58] Field of Search .............. 156/232, 256, 498, 499, 156/69, 70; 425/508, 179, 233, 526, 535, 392, 403.1, 437, 446

[56] References Cited

U.S. PATENT DOCUMENTS

| | | | |
|---|---|---|---|
| 1,757,053 | 5/1930 | Minor | 525/383 |
| 2,317,890 | 4/1943 | Dawson | 34/219 |
| 2,500,963 | 3/1950 | Somes | 134/141 |
| 3,322,869 | 5/1967 | Scott, Jr. | 425/508 |
| 3,449,183 | 6/1969 | Zelnick | 156/498 |
| 3,880,695 | 4/1975 | Standley et al. | 136/498 |
| 4,062,718 | 12/1977 | Hay, III | 156/498 |
| 4,252,753 | 2/1981 | Rips | 264/236 |
| 4,443,288 | 4/1984 | Sawada et al. | 156/499 |

Primary Examiner—Richard V. Fisher
Assistant Examiner—Wanda L. Millard
Attorney, Agent, or Firm—Cushman, Darby & Cushman

[57] ABSTRACT

A compact apparatus for curing an uncured resin impregnated in a filter element (12) having a uniform cross-section in the longitudinal direction, and for reinforcing the filter element (12). The apparatus includes a curing pot (38) formed of outer and inner tubes (40, 42) secured integrally and coaxially with each other to form an annular space (44) therebetween, having a cross-section similar to that of the filter element (12) to be treated, for accommodating the filter element (12) therein during the curing process. A hot air circulation mechanism for forcibly supplying hot air through the filter element (12) in the annular space (44) is provided so that the temperature of the filter element (12) is effectively elevated to a value at which the curing of the resin is completed. The curing operation can be sequentially carried out by intermittently displacing a holder (64) accommodating the filter element (12) therein to an operational position and transferring the filter element (12) into the curing pot (38).

18 Claims, 4 Drawing Sheets

APPARATUS FOR CURING RESIN IMPREGNATED IN FILTER ELEMENT

BACKGROUND OF THE INVENTION

1. Field of the Invention

The present invention relates to an apparatus for curing an adhesive resin (binder) impregnated in a filter element during manufacture of an oil filter or an air filter for an automobile.

2. Description of the Related Art

In general, a disposable type filter element is produced by rolling a predetermined length of a strip of a filter material into a cylindrical form after the strip has been corrugated in a continuous manner and mounting fittings such as a protector inside. The filter material composed of wood pulp and polyester staple must be reinforced by inter-fiber bonding with a binder of thermosettable phenolic resin, and a strip of a filter material is impregnated with the above resin before delivery from a strip maker. At this stage, however, the resin between the fibers has not been cured but only a solvent for the resin has been removed. After the resin has been cured and hardened by heat-processing the shaped material, the filter element is reinforced to obtain a desired bending strength thereof.

In the conventional process, a hot air circulation oven, as shown in FIG. 6, is utilized for heat-processing the filter element to cure the resin impregnated therein and to impart the desired strength. This oven is provided with a fan 2 within a housing 3 of the oven, which fan is driven by a motor 1 to circulate hot air within the oven. A pair of heaters 4 are disposed across the passageway of the hot air, and a temperature in the oven is always maintained at a predetermined value by regulating the heaters 4 by a thermocontroller (not shown). An exhaust opening 6 and a suction opening 7 are formed by partitions 5a, 5b, and 5c. A conveyor 8 is disposed horizontally through the housing 3 of the oven, on which conveyor 8 a plurality of curing pots 9, each accommodating a filter element 12, are deposited. As shown in FIG. 7, the pot 9 is formed of an outer tube 10 and an inner tube 11 secured coaxially to each other, and the uncured filter element 12 is accommodated in a space formed between the outer and inner tubes 10 and 11, to maintain the profile thereof in a stationary position during the curing process.

In the above oven, since the hot air can not easily penetrate the body of the filter element 12, a longer processing period, for example, about 20 min. at an environmental temperature of 180° C., is required for curing the resin impregnated in the filter element 12. This is especially true when the filter element 12 has a higher density, as shown in FIG. 4. Thus, for a continuous curing process, the oven must be large in size so that a large number of filter elements, e.g., a thousand or more, can be deposited on the conveyor in order to realize an economical processing speed. This, of course, requires an enormous installation cost and a vast floor space, which, in turn, results in a high manufacturing cost of the filter element.

SUMMARY OF THE INVENTION

It is an object of the present invention to eliminate the drawbacks of the prior arts described above and to provide a compact apparatus for efficiently curing a filter element within a shorter period.

This object is achievable, according to the present invention, by an apparatus for curing an uncured resin contained in a filter element having a uniform cross-section throughout the length thereof, to harden and strengthen the filter element, comprising a curing pot formed of an outer tube and an inner tube secured integrally and coaxially with each other to form an annular space between the outer and inner tubes and having a cross-section corresponding to a profile of the filter element to be treated, the filter element being accommodated in the annular space during the curing operation in a compact and easily removable manner; and means for circulating a hot air through the annular space, provided with inlets at a midportion of a side wall of the inner cylinder and at a middle portion of a side wall of the outer tube, respectively, for blowing the hot air into the annular space, and with outlets at upper and lower region of a side wall of the outer tube, respectively, for sucking the hot air from the annular space, whereby the filter element accommodated in the annular space is forcibly penetrated by the hot air and the resin contained therein is cured.

Provision of the inlets at midportions of the inner and outer tubes and the outlets at the upper and lower regions of a side wall of the outer cylinder enables the hot air to forcibly and uniformly penetrate the filter element accommodated in the annular space, whereby the heat can be effectively transmitted from the hot air to the filter element and the resin contained therein can be cured and hardened in a short period.

In the preferred embodiment, the annular space may be of a height capable of accommodating at least two filter elements in series, so that the capacity of the apparatus is increased.

According to another aspect of the present invention, the apparatus further comprises a movable holder for temporarily accommodating therein the filter element to be treated and transferring the same between a first position at which an open end of the pot is aligned with the holder and a second position remote from the first position, means for causing the holder to displace between the first position and the second position, means for pushing the filter element out from the holder into the annular space of the curing pot when the holder is positioned in the first position, and means for removing the cured filter element from the curing pot into the holder.

This enables a continuous processing of the filter element.

BRIEF DESCRIPTION OF THE DRAWINGS

The other objects and advantages of the present invention will be more apparent from the following description with reference to the accompanying drawings illustrating the preferred embodiments of the present invention, wherein.

DESCRIPTION OF THE PREFERRED EMBODIMENTS

Figure 2:
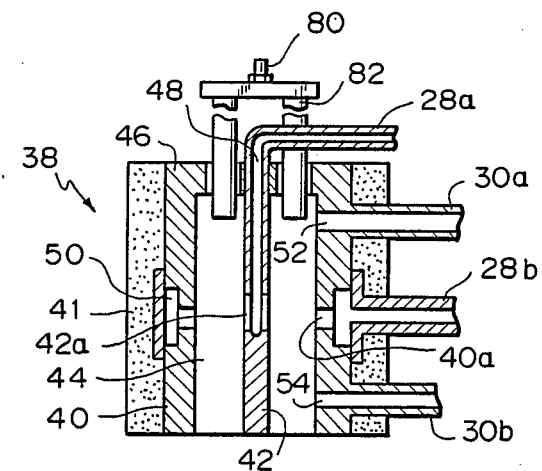
FIG. 2 is a side sectional view of a curing pot used in the apparatus of FIG. 1.
Figure 3:
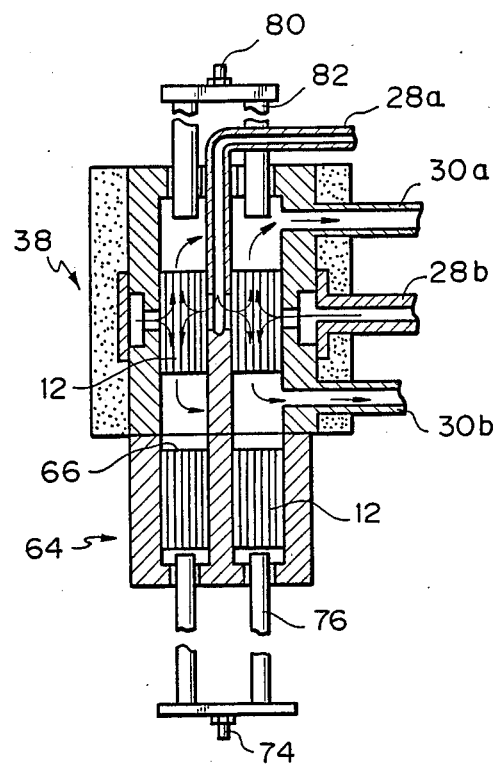
FIG. 3 is a side sectional view illustrating the alignment of the curing pot with a push-out mechanism.

A description of preferred embodiments of the present invention will be given with reference to FIGS. 1 through 3, wherein an apparatus 20 according to the present invention is installed on a base 24 fixed to a floor 22. A blower 26 constructed to be durable against heat is provided on the base 24. The output and input of the blower 26 are connected to a hot air exhaust duct 28 and a hot air suction duct 30, respectively. The ducts 28 and 30 are bifurcated to form branches 28a, 28b; and 30a, 30b, respectively, and lead into a curing pot 38 described later. An electric heater 32 is provided midway of the exhaust duct 28, which heater 32 is connected to an electric source through a conventional type temperature controller (not shown). This temperature controller regulates the heater 32 to maintain a hot air temperature at a predetermined value, for example, 180° C., in response to a signal generated from a thermocouple (not shown) fitted in the duct 28 or 30. Thus, the means for circulating hot air through an annular space in the curing pot 38 described later is constituted by the blower 26, ducts 28 and 30, and the heater 32. It will be apparent to a person skilled in the art that a burner may be utilized in place of the electric heater 32.

A pillar 36 stands on the base 24, and the curing pot 38 is secured thereto. As shown in FIG. 2, the pot 38 consists of an outer tube 40 having a circular cross-section and an inner tube 42 having a diameter smaller than diameter of the outer tube 40, and fixed coaxially thereto, so that an annular space 44 is formed between the two tubes 40 and 42. An upper end of the annular space 44 is substantially closed by a top wall 46 of the pot 38, and a lower end thereof is freely open. An upper half of the inner tube 42 is actually tubular, and a lower half thereof is solid. An upper end of the inner tube 42 communicating to the tubular interior thereof forms an inlet for hot air and is connected to one of the branches 28a of the duct 28. On the other hand, the outer tube 40 has an annular groove 50 in a middle region of the outer periphery of a side wall thereof, and a plurality of apertures 42a, 40a are provided in side walls of the inner and outer tubes 42, 40, respectively, facing the groove 50. The aperture 40a in the outer cylinder 40 is connected to the branch 28b of the duct 28. Furthermore, two outlets 52 and 54 for hot air are provided in upper and lower regions of the side wall of the outer tube 40 sectioned by the groove 50 through the side wall and are connected to the branches 30a, 30b of the duct 30, respectively. The outer periphery of the outer tube 40 is covered by a thermo-insulation member 41.

The annular space 44 formed between the two tubes 40 and 42 functions not only to constitute a room for accommodating a filter element to be treated and a passage for hot air, but also to maintain a cross-sectional shape of the filter element in a predetermined profile. Therefore, the shape and size of the annular space is defined to match those of the filter element to be treated.

Figure 4:
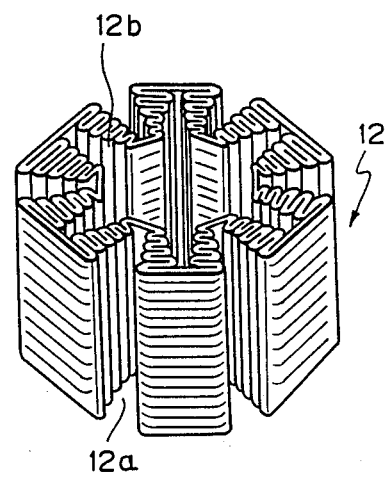
FIG. 4 is a partially broken perspective view of a high density filter element to which the present invention is suitably applied.
Figure 5:
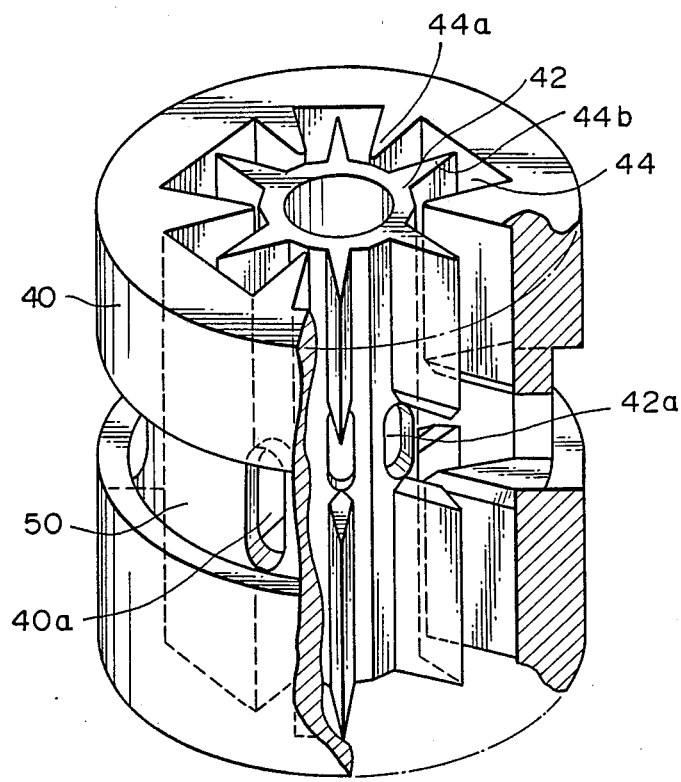
FIG. 5 is a partially broken view of a curing pot suitably utilized for treating the filter element shown in FIG. 4.

FIG. 5 illustrates one embodiment of a curing pot 38 suitably utilized for processing a high density filter element 12 having a hexagonal cross-section as shown in FIG. 4. The inner surface of the outer tube 40 has six longitudinal ribs 44a arranged equiangularly therearound and projected radially inward, each of which ribs 44a corresponds to the respective slots 12a forming an outer profile of the filter element 12. The outer surface of the inner tube 42 has six longitudinal ribs 44b arranged equiangularly therearound and projected radially outward, each of which ribs 44b corresponds to the respective slots forming an inner profile of the filter element 12.

Figure 1:
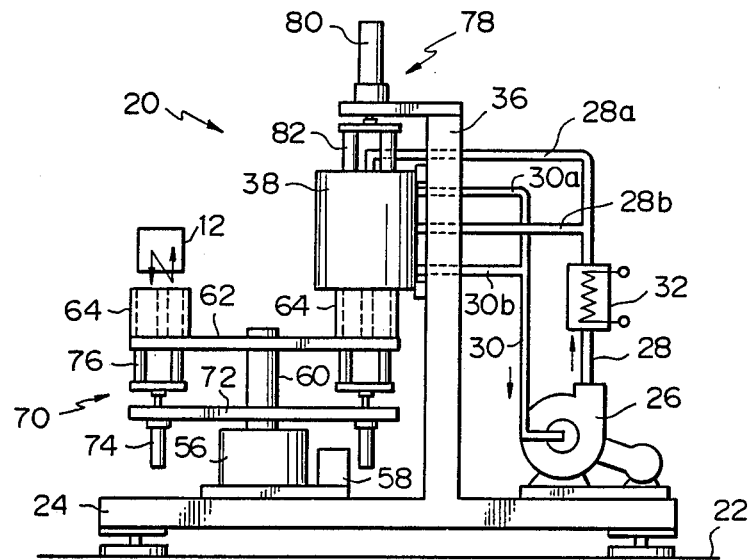
FIG. 1 is a side elevational view illustrating an overall installation of an apparatus according to one embodiment of the present invention.

As shown in FIG. 1, a turn-table unit 56 is mounted on the base 24 as a displacing mechanism. This unit 56 includes a turn-table 62 mounted on a top of a vertical shaft 60 intermittently driven by a motor 58. In the embodiment illustrated, two holders 64 are fixed on the turn-table 62 at positions diametrically opposed to each other. It should be noted, however, that the number of holders 64 is not limited to two but may be optional, provided they are arranged equiangularly around the shaft 60. As shown in FIG. 3, the respective holder 64 has a vertically extending annular space 66 having a cross-sectional shape substantially similar to that of the aforesaid annular space 44 in the curing pot 38, for temporary accommodation of a filter element 12 to be treated. The turn-table unit 56 is intermittently rotatable so that the holder 64 alternately occupies a curing position (right-hand in FIG. 1) where the respective holder 64 is in alignment with the bottom of the curing pot 38, and a loading/unloading position (left-hand in FIG. 1) diametrically opposed to the former position. Another turn-table 72 is secured on the shaft 60 beneath the turn-table 62 in a coaxial manner therewith. On the second turn-table 72, two push-out mechanisms 70 are fixed in alignment with the respective holders 64. The respective mechanism 70 includes a vertical power cylinder 74 for reciprocating a plurality of pushing rods 76 fixed vertically on a plate at an upper end of a piston rod of the power cylinder 74. The pushing rods 76 are arranged in a circle to be able to project into the annular space 66 through the turn-table 62 and a bottom wall of the holder 64. In this regard, suitable apertures are provided in the turn-table 62 and the wall of the holder 64 as passageways for the pushing rods 76.

A knock-out mechanism 78 is arranged directly above the curing pot 38. This mechanism 78 includes a vertical power cylinder 80 supported on the pillar 36 and a plurality of circularly arranged knock-out pins 82 vertically reciprocated by the power cylinder 80. According to this structure, the knock-out pins 82 can project into the annular space 44 through the corresponding apertures in a top wall 46 of the pot 38.

The operation of the above apparatus will be now explained.

An uncured filter element 12 is loaded in the holder 64 occupying the loading/unloading position described before by hand of an operator or by a suitable loader. The holder 64 is then displaced to the curing position beneath the curing pot 38 by a 180° rotation of the turn-table 62, as shown in FIG. 3. Next, the filter element 12 in the holder 64 is transferred into the annular space 44 of the pot 38 and advanced to the middle region thereof. Prior to this stage, hot air maintained at a predetermined temperature by the heater 32 is already being circulated through the interior of the pot 38 by the circulation means. When the filter element 12 has been loaded in the pot 38, the hot air is introduced into the interior of the inner tube 42 through the branch 28a and exhausted therefrom to the annular space 44 through the aperture 42a bored in the midportion of the inner tube 42. Due to the hot air passing through the filter element during the above circulation, the temperature of the filter element 12 is elevated. The hot air is also introduced into the annular groove 50 of the outer tube 40 through the branch 28b and, further, reaches the annular space 44, during which progress the filter element 12 is heated in a similar manner as before. The used hot air is sucked into the branches 30a and 30b through the outlets 52 and 54 bored through the side wall of the outer tube 40.

Figure 6:
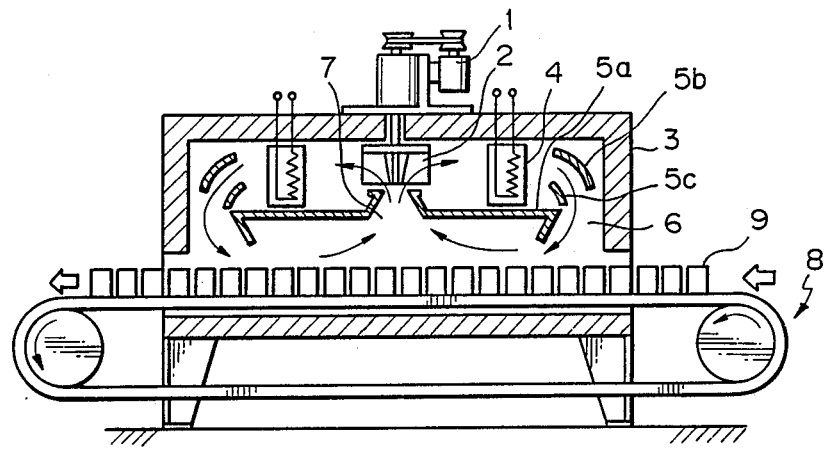
FIG. 6 is a diagrammatical side sectional view of a conventional oven utilized for curing the filter element.
Figure 7:
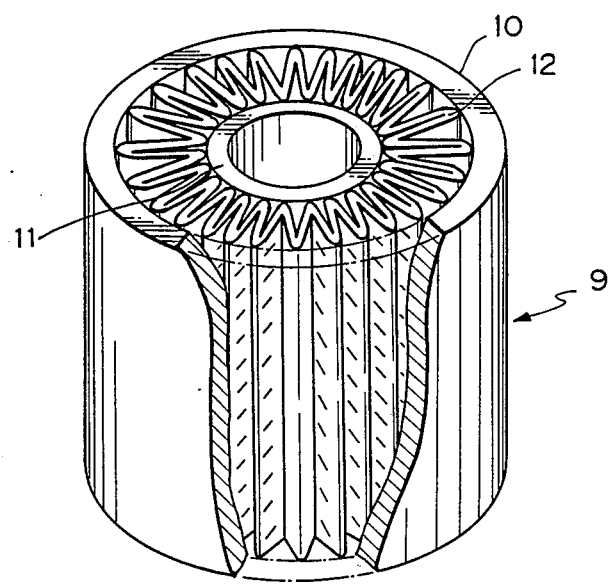
FIG. 7 is a partially broken perspective view of a conventional curing pot utilized in the oven shown in FIG. 6.

According to experiments conducted by the present inventors, the curing of the resin impregnated in the filter element was completed in about 30 seconds when hot air having a temperature of 180° C. was applied. This corresponds to a 40-fold increase in the processing rate, compared with the conventional system shown in FIG. 6. After the completion of the curing treatment, the filter element 12 is pushed out from the pot 38 and inserted in the holder 64 by the operation of the knock-out mechanism 78. The turn-table 62 is then rotated by 180° to displace the holder 64 to the loading/unloading position, at which the cured filter element 12 is taken out from the holder 64 and a fresh uncured filter element 12 loaded therein. The above process is sequentially repeated.

As stated above, since the apparatus according to the present invention is smaller in size when compared to the conventional apparatus utilizing a large-scale circulating oven, the overall dimensions of the curing system can be minimized. Therefore, the manufacturing cost of the apparatus can be decreased and the floor space for installation also can be reduced to a great extent.

Since the filter elements are processed sequentially one by one, an automatic production line for connecting this apparatus to a subsequent process can be easily laid out.

Moreover, the direct and forcible penetration of hot air through a filter element enables a much quicker curing operation compared to the conventional system, giving a remarkable increase in the processing rate.

We claim:

1. An apparatus for curing an uncured resin impregnated in a filter element having a uniform cross-section throughout the length thereof to harden and strengthen the filter element, comprising:
    a curing pot formed of an outer tube and an inner tube secured integrally and coaxially with each other to form an annular space between the outer and inner tubes having a cross-section corresponding to a profile of a filter element to be treated, the annular space being adapted to receive the filter element during the curing operation in a compact and easily removable manner; and
    means for circulating hot air through the annular space including inlets defined through a side wall of the inner tube at a midportion thereof and defined through a side wall of the outer tube at a midportion thereof, respectively, for blowing the hot air into the annular space, and outlets at upper and lower regions of the side wall of the outer tube, respectively, for sucking the hot air from the annular space,
    whereby the filter element accommodated in the annular space is forcibly penetrated by the hot air and the resin contained therein is cured.

2. An apparatus as defined by claim 1, wherein:
    the height of the annular space is capable of accommodating at least two filter elements in a stacked manner so that a capacity of the apparatus is increased.

3. An apparatus as defined in claim 1, wherein:
    each surface of the side wall of the outer and inner tubes opposing each other has a plurality of vertical ribs projecting toward a mating surface, each said rib being fitted in a corresponding slot forming a profile of the filter element to be accommodated in the annular space formed between the outer and inner tubes.

4. An apparatus as defined by claim 1 wherein the apparatus further comprises:
    a movable holder for temporarily accommodating therein the filter element to be treated and transferring the same between a first position at which an open end of the pot is in alignment with the holder and a second position remote from the first position,
    means for causing the holder to displace between the first position and the second position,
    means for pushing the filter element out from the holder into the annular space of the curing pot when the holder is positioned in the first position, and
    means for removing the cured filter element from the curing pot and placing it in the holder.

5. An apparatus as defined by claim 4, wherein:
    the displacing means comprises a turn-table mounting at least two holders, the holders being arranged equiangularly in a circle.

6. An apparatus as defined in claim 1, wherein:
    the circulation means comprises a blower, ducts connected to the blower and leading to the annular space of the curing pot, and a heater provided midway of the ducts.

7. An apparatus for curing an element, comprising:
    a curing pot formed of an outer tube and an inner tube secured integrally and coaxially with each other to form an annular space between the outer and inner tubes, the annular space being adapted to receive the element during the curing operation in a compact and easily removable manner; and
    means for circulating hot air through the annular space including an inlet defined through a sidewall of the inner tube and an inlet in the outer tube blowing the hot air into the annular space, and at least one outlet in the outer tube for sucking the hot air from the annular space.

8. An apparatus as defined by claim 7, wherein:
    the height of the annular space is capable of accommodating at least two filter elements in a stacked manner so that a capacity of the apparatus is increased.

9. An apparatus as defined by claim 7, wherein:
    each surface of the side walls of the outer and inner tubes opposing each other has a plurality of vertical ribs projecting toward a mating surface, the respective rib being fitted in a corresponding slot forming a profile of the filter element to be accommodated in the annular space formed between the outer and inner tubes.

10. An apparatus as defined by claim 7, wherein the apparatus further comprises:
- a movable holder for temporarily accommodating therein the filter element to be treated and transferring the same between a first position at which an open end of the pot is in alignment with the holder and a second position remote from the first position,
- means for causing the holder to displace between the first position and the second position,
- means for pushing the filter element out from the holder into the annular space of the curing pot when the holder is positioned in the first position; and
- means for removing the cured filter element from the curing pot and placing it in the holder.

11. An apparatus as defined by claim 10, wherein:
the displacing means comprises a turntable mounting at least two holders, the holders being arranged equiangularly in a circle.

12. An apparatus as defined in claim 7, wherein:
the circulation means comprises a blower, ducts connected to the blower and leading to the annular space of the curing pot, and a heater provided midway of the ducts.

13. An apparatus for curing an uncured resin impregnated in a filter element having a uniform cross-section throughout the length thereof to harden and strengthen the filter element, comprising:
- a curing pot formed of an outer tube and an inner tube secured integrally and coaxially with each other to form an annular space between the outer and inner tubes having a cross-section corresponding to a profile of a filter element to be treated, the annular space being adapted to receive the filter element during the curing operation in a compact and easily removable manner, said inner tube extending along said outer tube at least as long as the filter element for holding the filter element; and
- means for circulating hot air through the annular space including at least one of an inlet, for blowing the hot air into the annular space, and an outlet, for sucking the hot air from the annular space, defined through a sidewall of the inner tube and at least one of an inlet, for blowing the hot air into the annular space, and an outlet, for sucking the hot air from the annular space, in the outer tube,
- whereby the filter element accommodated in the annular space is forcibly penetrated by the hot air and the resin contained therein is cured.

14. An apparatus as defined by claim 13, wherein:
the height of the annular space is capable of accommodating at least two filter elements in a stacked manner so that a capacity of the apparatus is increased.

15. An apparatus as defined by claim 13, wherein:
each surface of the side walls of the outer and inner tubes opposing each other has a plurality of vertical ribs projecting toward a mating surface, the respective rib being fitted in a corresponding slot forming a profile of the filter element to be accommodated in the annular space formed between the outer and inner tubes.

16. An apparatus as defined by claim 13, wherein the apparatus further comprises:
- a movable holder for temporarily accommodating therein the filter element to be treated and transferring the same between a first position at which an open end of the pot is in alignment with the holder and a second position remote from the first position;
- means for causing the holder to displace between the first position and the second position,
- means for pushing the filter element out from the holder into the annular space of the curing pot when the holder is positioned in the first position, and
- means for removing the cured filter element from the curing pot and placing it in the holder.

17. An apparatus as defined by claim 16, wherein:
the displacing means comprises a turntable mounting at least two holders, the holders being arranged equiangularly in a circle.

18. An apparatus as defined in claim 13, wherein:
the circulation means comprises a blower, ducts connected to the blower and leading to the annular space of the curing pot, and a heater provided midway of the ducts.

* * * * *